June 3, 1930.   F. FRASER   1,761,204
PROCESS AND APPARATUS FOR PRODUCING SHEET GLASS
Filed Dec. 17, 1926
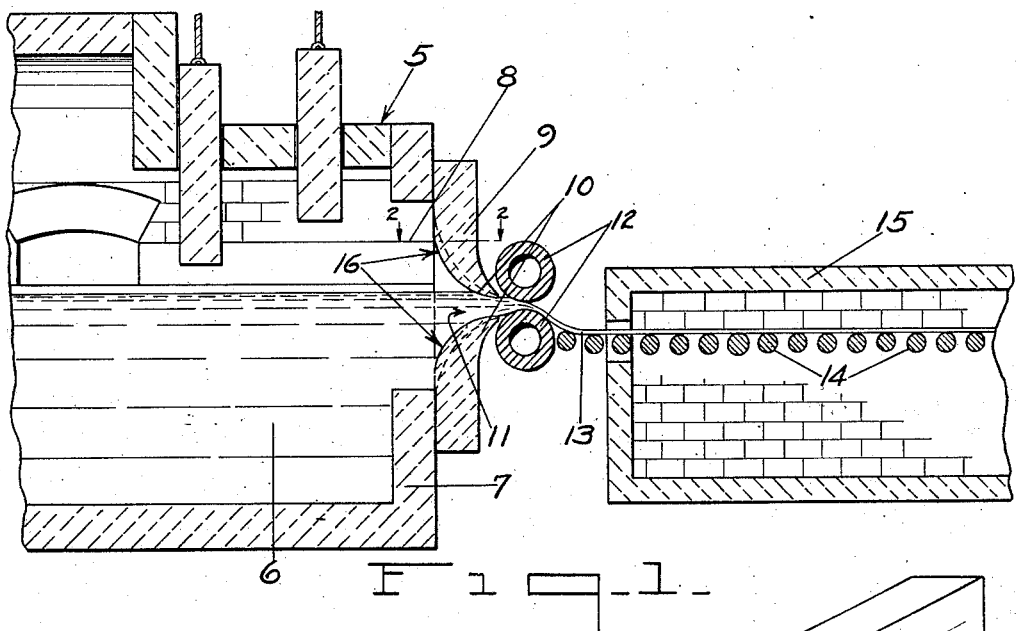
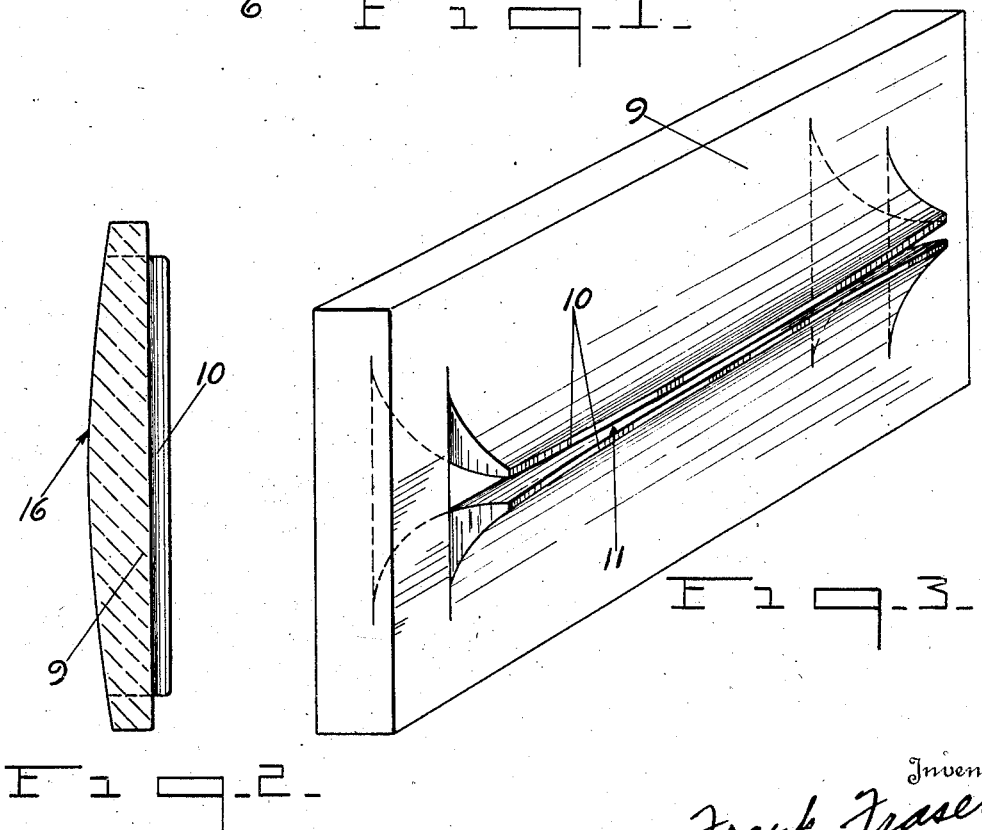
Inventor
Frank Fraser Patented June 3, 1930

1,761,204

UNITED STATES PATENT OFFICE

FRANK FRASER, OF TOLEDO, OHIO, ASSIGNOR TO LIBBEY-OWENS GLASS COMPANY, OF TOLEDO, OHIO, A CORPORATION OF OHIO

PROCESS AND APPARATUS FOR PRODUCING SHEET GLASS

Application filed December 17, 1926. Serial No. 155,402.

This invention relates to the manufacture of sheet glass and has more particular reference to improved apparatus for producing a continuous sheet.

The molten glass contained within a tank furnace is not ordinarily uniform in temperature throughout the entire width of the tank but instead the border portions of the glass are relatively cooler than the central flow thereof. Due to this difference in temperature, the flow movement of the central portion of glass through the tank is more rapid than that of the border portions with the result that the glass when introduced into a sheet does not have a uniform flow movement throughout its entire width. This un-uniform flow of the glass as it is introduced into the sheet causes difficulty in the forming of a good sheet of glass.

It is, therefore, an important object of the present invention to provide in sheet glass apparatus, an improved tank furnace wherein the stream of molten glass flowing therefrom will have a substantially uniform flow movement throughout its entire width.

Another object of the invention is to provide in sheet glass apparatus, a tank furnace for supplying a stream of molten glass to sheet forming means, and means whereby the flow movement of the central portion of the molten stream will be retarded to a greater degree than will the border portions thereof as the said stream flows from the tank.

A further object of the invention is to provide in sheet glass apparatus, a tank furnace for supplying a continuous stream of molten glass to sheet forming means, and a slotted member through which the said stream is adapted to flow, said slotted member being constructed to substantially equalize the flow movement of the stream throughout its entire width as the said stream flows therethrough.

A still further object of the invention is to provide such an improved slotted member for feeding a stream of molten glass to sheet forming means so constructed that the central portion of the stream will contact therewith a longer period than will the border portions.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through improved sheet glass apparatus constructed in accordance with the present invention.

Fig. 2 is a section taken on line 2—2 of Fig. 1, and

Fig. 3 is a perspective view of the improved slotted member.

In the drawings, the numeral 5 designates the exit end of a glass melting furnace of any desired construction and within which the glass batch containing the ingredients from which the molten glass is produced, is melted to form the mass of molten glass 6. The end wall 7 of the tank is provided with a relatively large outlet opening 8 and positioned in advance of the said opening and closing the greater portion thereof is the improved refractory member 9 provided with a pair of outwardly directed lips 10 spaced to create a horizontal slot 11 which is preferably disposed somewhat beneath the level of the molten glass 6.

Arranged in advance of the refractory member 9 and adjacent the lips 10 is a pair of spaced internally cooled sheet forming rolls 12. The molten glass 6 is adapted to flow in a continuous stream through the slot 11 in member 9 and between the rolls 12 which serve to reduce the said stream to sheet form as indicated at 13. This continuous sheet is then carried along upon a plurality of supporting rolls 14 into an annealing leer 15 where it is gradually reduced to room temperature as is well known in the art.

It will be noted that the molten glass 6 within the tank is forced therefrom under the action of a head pressure so that the resultant sheet is formed from the lower surface glass within the tank and not from the surface glass contained therein. The outwardly directed lips 10 are arranged to shield the rolls 12 to a large extent from contact with the molten glass so that the area of contact between the glass and rolls is reduced.

The present invention relates particularly to the novel construction of the refractory member 9 whereby the stream of molten glass fed to the sheet forming rolls 12 will have a substantial uniform flow movement throughout its entire width. As shown, the central portions of the spaced lips 10 are relatively close to one another and these lips gradually diverge towards their opposite ends. This formation will create a slot 11 which is relatively narrow at its center and which gradually enlarges or becomes wider towards its opposite ends. The narrow central portion of the slot 11 is adapted to be in line with the central flow of the molten glass 6 while the enlarged ends of said slot are adapted to be in line with the border portions thereof. With such an arrangement, it will be readily apparent that the central portion of the molten glass flowing through the narrow central portion of the slot 11 will be retarded to a greater degree than will the border portions of the molten glass which are permitted to flow more freely through the wider end portions of the said slot.

The inner surfaces 16 of the lips 10 are also longitudinally bowed as shown in Fig. 2 so that the central portions of said lips extend inwardly into the molten glass a greater distance than the end portions, with the result that the area of contact between the glass and lips is greater at the central portions of said lips and gradually diminishes towards the opposite ends thereof. Due to the increased area of contact at the central portions of the lips 10, the central flow of molten glass will therefore contact with the said lips a longer period than will the border portions so that the central flow of glass will also be retarded in this manner more than will the border portions.

Due to the particular construction of the lips 10 and formation of slot 11, the central portion of the molten glass 6 which normally flows faster than the border portions will be retarded to a greater degree than will the said border portions so that when the stream of molten glass is delivered to the sheet forming rolls 12, the flow movement of the central portion will be substantially the same as the said border portions.

The fact that the stream of glass introduced into the sheet will have a substantially uniform flow movement throughout its entire width will result in the production of better sheet of glass. The slower flow movement also effects the temperature, so that the temperature as well as the speed of flow is acted upon in a manner to equalize the rate of flow and the temperature of the glass throughout its entire width.

It is to be understood that the form of the invention herewith shown and described is to be taken as the preferred embodiment of the same, and that various changes in the shape, size and arrangement of parts may be resorted to without departing from the spirit of the invention or the scope of the subjoining claims.

Claims:

1. In sheet glass apparatus, a tank furnace for supplying a stream of molten glass to sheet forming means, including a slotted member so constructed that the central portion of the stream will contact therewith a longer period than will the border portions as said stream flows from the tank.

2. In sheet glass apparatus, a tank furnace for supplying a stream of molten glass to sheet forming means, including a slotted member for substantially equalizing the flow movement of the stream throughout its entire width as said stream flows from the tank, the slot in said member being narrower at its center than at its ends.

3. In sheet glass apparatus, a tank furnace for supplying a stream of molten glass to sheet forming means, including a slotted member for substantially equalizing the flow movement of the stream throughout its entire width as said stream flows from the tank, the slot in said member being relatively narrow at its center and gradually enlarging towards its opposite ends.

4. In sheet glass apparatus, a tank furnace for supplying a stream of molten glass to sheet forming means, including a slotted member for substantially equalizing the flow movement of the stream throughout its entire width as the said stream flows from the tank, said member being provided with spaced lips arranged closer together at their central portions than at their ends.

5. In sheet glass apparatus, a tank furnace for supplying a stream of molten glass to sheet forming means, including a slotted member for substantially equalizing the flow movement of the stream throughout its entire width as the said stream flows from the tank, said member being provided with spaced lips arranged relatively close together at their central portions and gradually diverging towards their opposite ends.

6. In sheet glass apparatus, a tank furnace for supplying a stream of molten glass to sheet forming means, including a slotted member for substantially equalizing the flow movement of the stream throughout its entire width as the said stream flows from the tank, said member being provided with spaced lips arranged to create a slot gradually enlarging from its center towards its opposite ends.

7. In sheet glass apparatus, a tank furnace for supplying a stream of molten glass to sheet forming means, including a slotted member associated with one vertical wall thereof and provided with spaced lips having longitudinally bowed inner surfaces.

8. In sheet glass apparatus, a tank furnace for supplying a stream of molten glass to sheet forming means, including a slotted member associated with one vertical wall thereof and provided with spaced lips, the slot of said member being relatively narrow at its center and gradually enlarging towards its opposite ends, and the said lips having longitudinally bowed inner surfaces.

9. In sheet glass apparatus, a tank furnace for supplying a stream of molten glass to sheet forming means, including a slotted member associated with one vertical wall thereof and whose inner surfaces have a greater glass contacting area at their centers than at their ends.

10. In sheet glass apparatus, a tank furnace for supplying a stream of molten glass to sheet forming means, including a slotted member associated with one vertical wall thereof and provided with lips whose inner surfaces are longitudinally bowed to create a relative greater glass contacting area at their centers than at their ends.

11. A member for feeding a stream of molten glass in a generally horizontal direction to sheet forming means, having a slot therein narrower at its center than at its ends.

12. A member for feeding a stream of molten glass in a generally horizontal direction to sheet forming means having a slot therein relatively narrow at its center and gradually enlarging towards its opposite ends.

13. A member for feeding a stream of molten glass in a generally horizontal direction to sheet forming means, said member being formed with a pair of spaced lips closer together at their centers than at their ends.

14. A member for feeding a stream of molten glass in a generally horizontal direction to sheet forming means, said member being formed with a pair of spaced lips relatively close to one another at their central portions and gradually diverging towards their opposite ends.

15. A member for feeding a stream of molten glass in a generally horizontal direction to sheet forming means, said member having a pair of spaced lips arranged to create a longitudinally extending slot gradually enlarging from its center towards its opposite ends.

16. A member for feeding a stream of molten glass in a generally horizontal direction to sheet forming means, said member being formed with a pair of spaced lips having longitudinally bowed inner surfaces.

17. A member for feeding a stream of molten glass in a generally horizontal direction to sheet forming means, said member being formed with a pair of spaced lips arranged to create a longitudinally extending slot narrower at its center than at its ends, the inner surfaces of said lips being longitudinally bowed, whereby the central portions of said surfaces have a greater glass contacting area than the ends thereof.

18. A member for feeding a stream of molten glass in a generally horizontal direction to sheet forming means, said member being formed with a pair of spaced lips whose inner surfaces are longitudinally bowed to create a relatively greater glass contacting area at their centers than at their ends.

19. The process of producing sheet glass consisting in flowing glass under pressure through a slotted member in a generally horizontal direction and in a manner that the central portion of the flow of glass is retarded more than the border portions thereof, whereby to equalize the flow movement of said glass, and then reducing the flow of glass to sheet form.

20. The process of producing sheet glass consisting in flowing glass under pressure horizontally through a slotted member in a manner that the central portion of the glass is retarded to equalize the flow movement of the glass, and then rolling said glass to sheet form of substantially predetermined dimensions.

Signed at Toledo, in the county of Lucas, and State of Ohio, this 15th day of December, 1926.

FRANK FRASER.